United States Patent
Bui et al.

(10) Patent No.: US 6,721,126 B1
(45) Date of Patent: Apr. 13, 2004

(54) POSITION IDENTIFICATION FOR A COARSE ACTUATOR PORTION OF A COMPOUND ACTUATOR

(75) Inventors: Nhan Xuan Bui, Tucson, AZ (US); John Alexander Koski, Tucson, AZ (US); Akimitsu Sasaki, Yokohama (JP); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 09/641,135

(22) Filed: Aug. 16, 2000

(51) Int. Cl.[7] .............................................. G11B 5/584
(52) U.S. Cl. ................................................. 360/78.12
(58) Field of Search ........................ 360/78.12, 78.05, 360/77.02, 78.02, 78.09, 294.3, 75, 77.12

(56) References Cited

U.S. PATENT DOCUMENTS

| | | | |
|---|---|---|---|
| 5,121,270 A | 6/1992 | Alcudia et al. | 360/77.01 |
| 5,379,170 A | 1/1995 | Schwarz | 360/109 |
| 5,434,732 A | 7/1995 | Schwarz et al. | 360/109 |
| 5,644,453 A | 7/1997 | Eckberg et al. | 360/106 |
| 5,689,384 A | 11/1997 | Albrecht et al. | 360/77.12 |
| 5,710,681 A | 1/1998 | Eckberg et al. | 360/106 |
| 5,726,824 A | 3/1998 | Ayres et al. | 360/77.12 |
| 5,793,573 A | 8/1998 | Eckberg et al. | 360/106 |
| 5,852,535 A | 12/1998 | Richardson et al. | 360/77.12 |
| 5,946,156 A | 8/1999 | Schwarz et al. | 360/109 |
| 5,946,159 A | 8/1999 | Chliwnyj et al. | 360/77.12 |
| 5,949,604 A | 9/1999 | Saliba | 360/76 |
| 5,982,711 A | 11/1999 | Knowles et al. | 368/77.12 |
| 6,021,013 A | 2/2000 | Albrecht et al. | 360/53 |
| 6,075,678 A | 6/2000 | Saliba | 360/106 |
| 6,078,476 A * | 6/2000 | Magee et al. | 360/294.3 |
| 6,282,051 B1 | 8/2001 | Albrecht et al. | 360/75 |
| 6,320,719 B1 | 11/2001 | Albrecht et al. | 360/77.12 |
| 6,414,815 B1 * | 7/2002 | Lee | 360/78.12 |
| 6,493,172 B1 * | 12/2002 | Morris et al. | 360/77.02 |
| 6,519,109 B1 * | 2/2003 | Price et al. | 360/78.09 |
| 6,542,326 B1 * | 4/2003 | Ell et al. | 360/78.05 |
| 6,580,581 B1 * | 6/2003 | Bui et al. | 360/78.02 |
| 6,587,303 B1 * | 7/2003 | Bui et al. | 360/78.12 |
| 6,621,653 B1 * | 9/2003 | Schirle | 360/78.12 |

* cited by examiner

Primary Examiner—David Hudspeth
Assistant Examiner—Fred F. Tzeng
(74) Attorney, Agent, or Firm—John H. Holcombe (57) ABSTRACT

A method and position control for a servo system for positioning a head laterally with respect to defined servo tracks. The servo system comprises a servo sensor and detector for sensing lateral position of the head and a compound actuator having a fine actuator portion and a coarse actuator portion. The position control provides position indications for the coarse actuator portion, which may comprise a table relating predetermined nominal lateral position indications to the defined servo tracks. The position control positions the coarse actuator portion at an estimated position with respect to the defined servo tracks, and responds to the servo sensor to determine which servo track is closest to the estimated position. The position control sets the coarse actuator portion position indication to the predetermined nominal lateral position indication of the closest defined servo track, e.g., by looking it up in the table. This thereby corrects the indication of the position of the coarse actuator portion.

28 Claims, 6 Drawing Sheets

| INDEX | TRACK (BAND) | RATIO A/B | STEPPER VALUE |
|---|---|---|---|
| TOP | | | |
| SERVO 0 | | 0.3552 | 3377 |
| SERVO 1 | 0-1 | 0.4131 | 3369 |
| SERVO 2 | | 0.4710 | 3360 |
| SERVO 3 | | 0.5290 | 3351 |
| SERVO 4 | | 0.5869 | 3343 |
| SERVO 5 | | 0.6448 | 3334 |
| BOTTOM | | | |
| TOP | | | |
| SERVO 0 | | 0.3552 | 2447 |
| SERVO 1 | 1-2 | 0.4131 | 2439 |
| SERVO 2 | | 0.4710 | 2430 |
| SERVO 3 | | 0.5290 | 2421 |
| SERVO 4 | | 0.5869 | 2413 |
| SERVO 5 | | 0.6448 | 2404 |
| BOTTOM | | | |
| TOP | | | |
| SERVO 0 | | 0.3552 | 1517 |
| SERVO 1 | 2-3 | 0.4131 | 1509 |
| SERVO 2 | | 0.4710 | 1500 |
| SERVO 3 | | 0.5290 | 1491 |
| SERVO 4 | | 0.5869 | 1483 |
| SERVO 5 | | 0.6448 | 1474 |
| BOTTOM | | | |
| TOP | | | |
| SERVO 0 | | 0.3552 | 0587 |
| SERVO 1 | 3-4 | 0.4131 | 0579 |
| SERVO 2 | | 0.4710 | 0570 |
| SERVO 3 | | 0.5290 | 0561 |
| SERVO 4 | | 0.5869 | 0553 |
| SERVO 5 | | 0.6448 | 0544 |
| BOTTOM | | | |

*FIG. 7*

FIG. 8

POSITION IDENTIFICATION FOR A COARSE ACTUATOR PORTION OF A COMPOUND ACTUATOR

FIELD OF THE INVENTION

This invention relates to servo systems employing compound actuators which comprise a fine actuator portion and a coarse actuator portion, and, more particularly, to positioning the coarse actuator portion of the compound actuator.

BACKGROUND OF THE INVENTION

In servo systems having compound actuators, such as for the transfer of data with data storage media, e.g., magnetic tape, the compound actuator provides both a large working dynamic range and high bandwidth. A typical compound actuator comprises a coarse actuator portion, such as a stepper motor, and a fine actuator portion,; such as a voice coil motor, mounted on the coarse actuator portion. Thus, in the example of data transfer, a data head can be translated between tracks over a full width of the magnetic tape using the coarse actuator portion, and can track follow the lateral movement of the track, using the fine actuator portion of the compound actuator.

The fine actuator portion of the compound actuator typically follows the track guiding disturbances, as determined by a servo sensor and detector which senses servo tracks, to position the data head in the center of the desired data track or tracks. It has relatively small mass and wide bandwidth and is thus able to follow high frequency disturbances. However, it has a very limited range of travel in order to provide the high bandwidth. The coarse actuator portion carries the fine actuator portion from track to track and also aids in centering the fine actuator portion.

In systems having one servo track per data track or set of parallel data tracks, the location of the actuator may have been determined by reading a track address recorded as a part of the servo track, for example, as illustrated by U.S. Pat. No. 15 5,121,270. However, it may be too costly to record addresses for the singly sensible servo tracks, and too time-consuming to read the address as compared to the short time required to access the data.

The data tracks are becoming increasingly smaller and closer together in order to increase data capacity, for example, of a given tape, by increasing the data track density. The increased data track density is handled by providing laterally indexed defined servo positions which are laterally equidistantly spaced across singly sensible servo tracks. As one example, 6 separate indexed defined servo positions are provided for a singly sensible servo track. It is not practical to record a separate address for each indexed defined servo position, and would prove highly costly to add precision sensors external to the servo sensors to attempt to determine the precise servo track which is being followed.

Ideally, a compound actuator positions the head at a desired index position, employing the coarse actuator portion, and then follows the index position of the defined servo track, employing the fine actuator portion. The coarse actuator portion is typically a stepper motor which is driven forward or backward by step drive pulses. The number of pulses are counted from a reference position, such as at the edge of the tape, and each index position is located at a step count of the stepper motor. Thus, the coarse actuator portion is moved to the step count of the desired indexed defined servo position.

The servo tracks are typically prerecorded and tend to be relatively fixed with respect to the tape, as does the indexed defined servo position. However, the tape tends to move laterally while-being guided across the tape head, and this movement tends to exceed the range of movement of the fine actuator portion. Hence, during the track following operation, both the coarse and fine actuator portions are actively controlled to achieve the track following requirements. The fine actuator portion has a high bandwidth response, and can follow fast changes in tape guiding. It also suppresses the effect of vibration and most shock disturbances to meet the track following requirements. However, its range of motion is limited, and it will typically not span the full dynamic range of motion required for following a data track over the full length of tape. The coarse actuator portion, which has a much slower response, but a very large stroke distance, is commanded to move to attempt to keep the fine actuator near it's center of motion. The result is a continuously varying lateral position for the coarse actuator. Additionally, the coarse actuator moves the head over long distances from servo track to servo track, requiring a large number of steps.

Consequently, if steps are missed, for example, due to friction, backlash, non-linearity, or mis-stepping, the position control for the coarse actuator portion accumulates an error between the actual coarse position and the assumed coarse position. If the step count is lost or is no longer accurate due to missed steps., the step count may be reinitialized by moving the compound actuator to the reference position, such as at the edge of the tape. However, significant time is lost in reinitializing the compound actuator, reducing the performance of the tape drive.

SUMMARY OF THE INVENTION

An object of the present invention is to provide the correct coarse position of the coarse actuator portion of a compound actuator.

Disclosed are,a method and position control for a servo system for positioning a head laterally with respect to defined servo tracks. The!servo system comprises a servo sensor and detector for sensing lateral position of the head with respect to the defined servo tracks, and a compound actuator having a fine actuator portion for translating the head laterally with respect to the defined servo tracks, and a coarse actuator portion for translating the fine actuator portion laterally with respect to the defined servo tracks.

The position control is coupled to the servo sensor and detector and is coupled to the compound actuator for operating the compound actuator to position the actuator portions. The position control,provides position indications for the coarse actuator portion comprising predetermined nominal lateral position indications with respect to the defined servo tracks. The predetermined nominal lateral position indications may comprise a table relating the predetermined nominal lateral position indications to the defined servo tracks. The position control positions the coarse actuator portion at an estimated position with respect to the defined servo tracks, and responds to the servo sensor and detector to determine which servo track position is closest to the estimated position. The position control sets the coarse actuator portion position indication to the predetermined nominal lateral position indication of the determined defined servo track, thereby correcting the indication of the position of, the coarse actuator portion. This may comprise looking up the determined defined servo track in the table to determine the coarse actuator portion predetermined nominal lateral position indication of the closest defined servo track.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art;that variations may be accomplished in view of these teachings without deviating from the spirit or scope of the invention.

Figure 1:
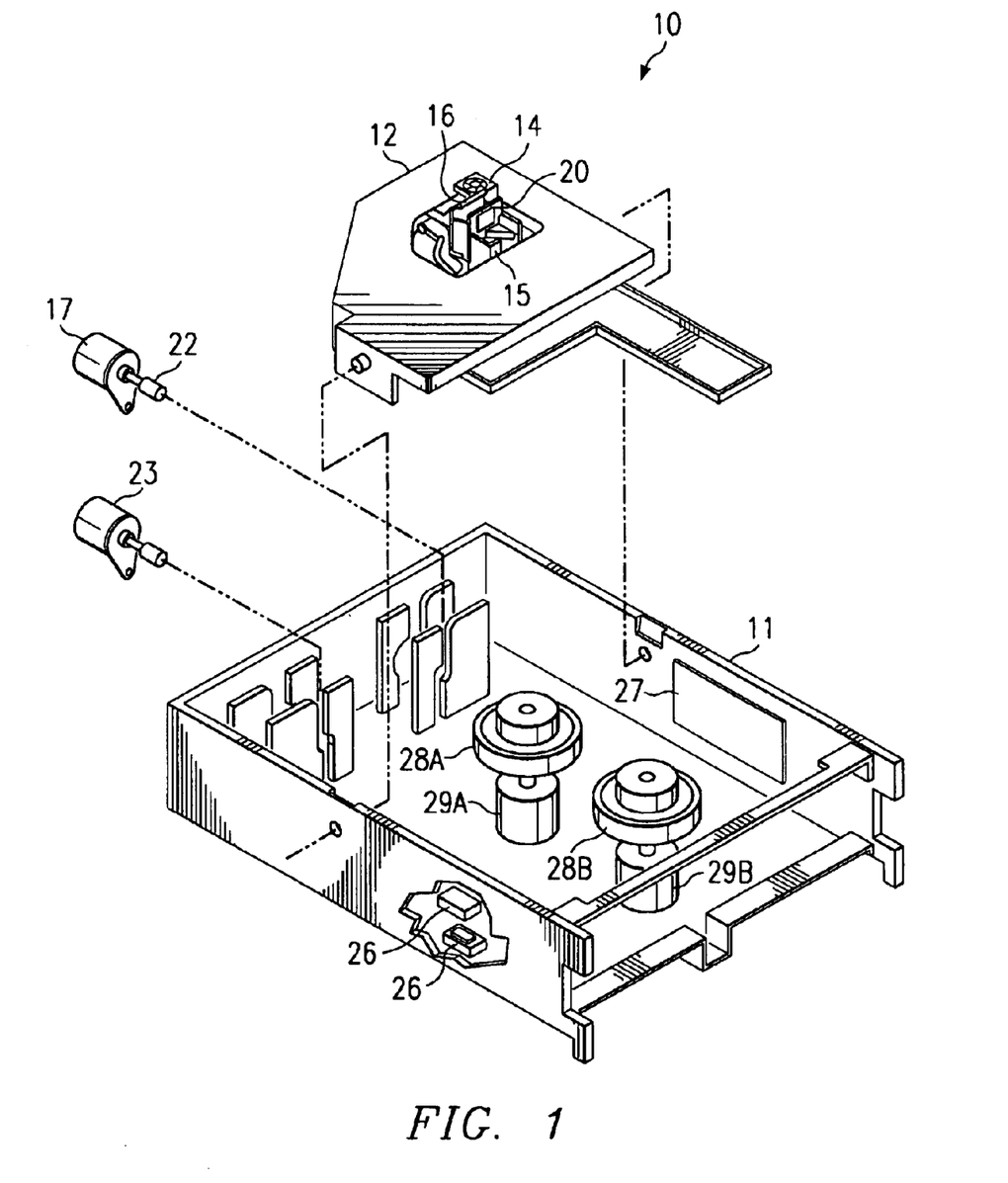
FIG. 1 is a partially exploded isometric view of a magnetic tape drive having a compound actuator and a servo system which may implement the present invention.

Referring to FIG. 1, a magnetic tape drive 10 is illustrated which may implement the present invention. A head and actuator assembly 12 is shown exploded out of the tape drive chassis 11. A magnetic tape head 15 is supported by a compound actuator 14. The magnetic tape head may comprise a plurality of read and write elements for reading and/or writing data on a magnetic tape, and at least one servo read element for reading servo information recorded on the magnetic tape.

The compound actuator 14 positions the tape head 15 laterally with respect to the magnetic tape to move the head between tracks and to follow desired tracks recorded longitudinally along the tape. The compound actuator 14 comprises a coarse actuator portion 16, employing, for example, a stepper motor 17; and comprises a fine actuator portion 20, employing, for example, a voice coil actuator, mounted on the coarse actuator portion 16. Thus, the tape head 15 can be translated between tracks over a full width of the magnetic tape primarily using the coarse actuator portion 16–17, and can track follow the lateral movement of the track, primarily using the fine actuator portion 20 of the compound actuator 14. One example of a compound actuator 14 is described in coassigned U.S. Pat. No. 5,793,573, and those of skill in the art understand that many differing types of compound actuators may be employed to implement the present invention. In the illustrated example, the coarse actuator portion stepper motor 17 positions the magnetic tape head through a gear 22, such as a worm gear.

The magnetic tape may be provided in a tape cartridge, and a tape cartridge receive/eject stepper motor 23 may provide the drive elements for receiving and ejecting the cartridges. The tape drive 10 may additionally comprise reels 28A, 28B, driven by motors 29A, 29B, for moving the tape longitudinally across the tape head 15. A cartridge sensor 26, such as an LED or RF receiver, may be provided to indicate whether a cartridge is present or absent.

The exemplary magnetic tape head 15 may additionally read servo information recorded on the magnetic tape in order to properly position the head laterally with respect to the tape, using the compound actuator 14. A servo controller 27 provides the electronics modules and processor to implement the present invention.

Figure 2:
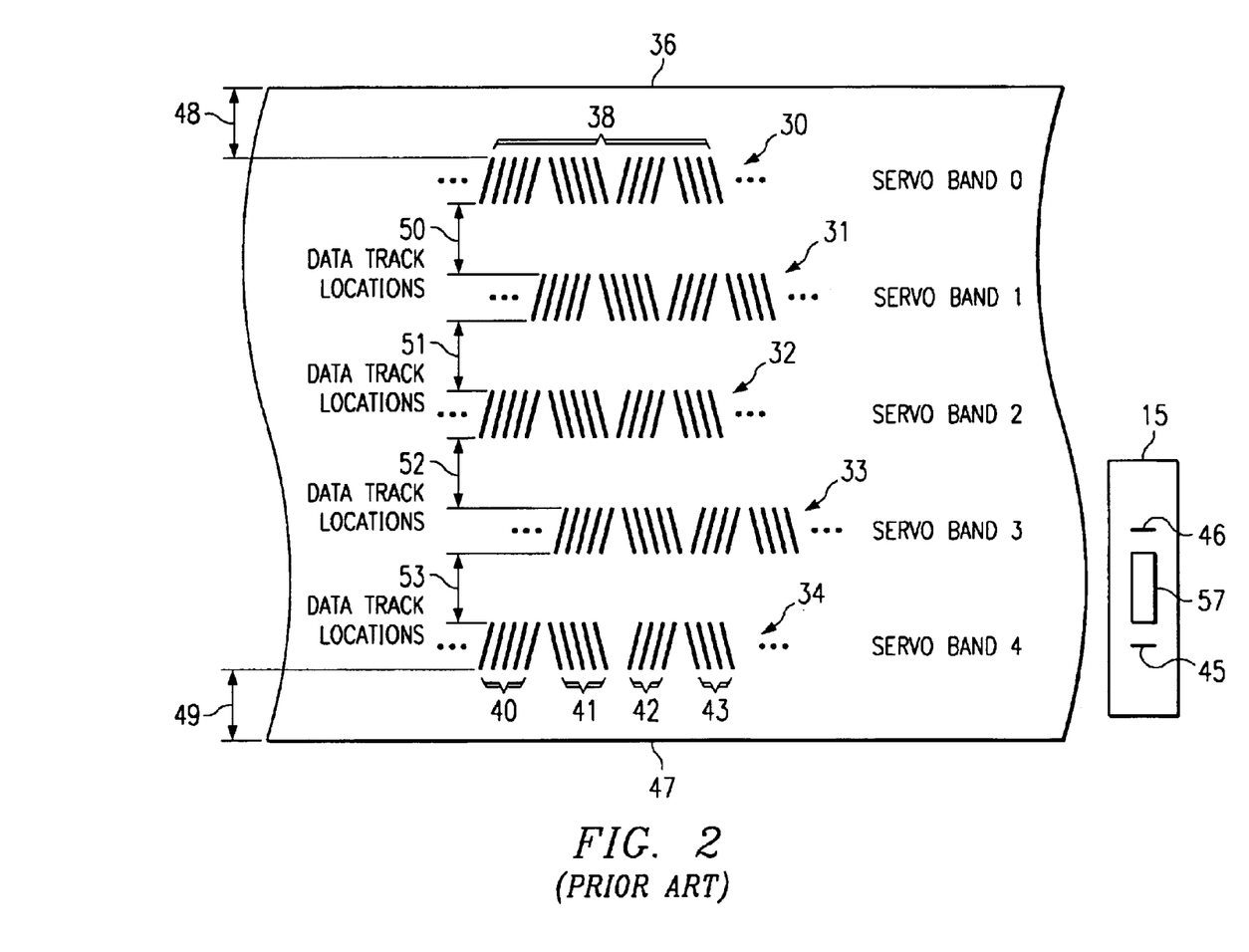
FIG. 2 is a diagrammatic representation of a prior art magnetic tape having multiple timing based servo tracks for use in the magnetic tape drive of FIG. 1.
Figure 3:
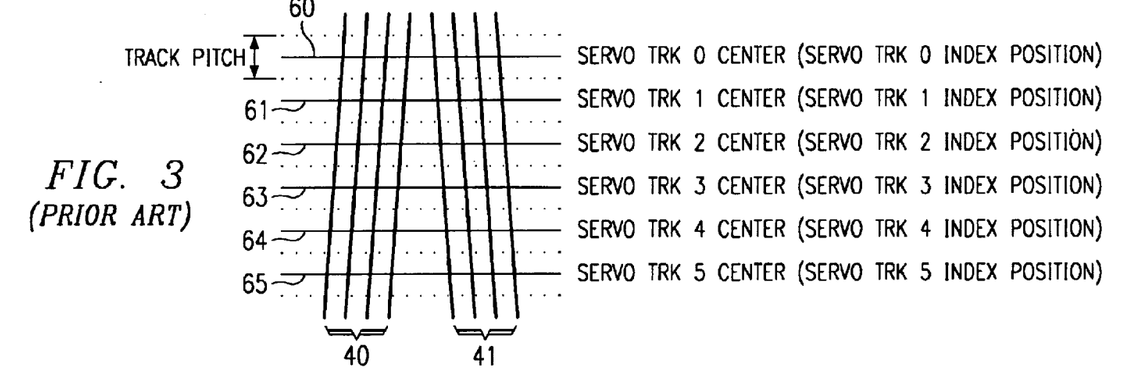
FIG. 3 is an expanded diagrammatic representation of a portion of a prior art timing based servo track of FIG. 2.

FIGS. 2 and 3 illustrate a timing based servo pattern of the type described in coassigned U.S. Pat. No. 5,689,384, wherein magnetic servo track patterns contain transitions recorded at differing azimuthal orientations across the width of the servo track. In the specific example of FIG. 2, five longitudinal timing based defined servo tracks 30–34 are prerecorded on a magnetic tape 36 for track following at these positions. The pattern of magnetic transitions recorded in the servo tracks is a repeated set of frames 38, each of which contain bursts 40–43 of magnetic transitions which are of different azimuthal orientations. In,the example of FIG. 2, a tape head 15 comprises at least one narrow servo read element 45, and, in the instant example, comprises a second narrow servo read element 46. With two servo read elements, two servo tracks may be sensed simultaneously, and the outputs averaged.

Position sensing is achieved by deriving a ratio of two servo pattern intervals and is insensitive to tape speed. Specifically, the lateral position may be the ratio of (1) the time between transitions of bursts 40 and 41, called the distance, to (2) the time between transitions of bursts 40 and 42, called the "B" distance, the ratio called the "A"/"B" ratio. Thus, as the tape head servo read element 45, 46 moves toward the edge 47 of the tape 36, the ratio of the time between the transitions of bursts 40 and 41 to the time between the transitions of bursts 40 and 42 becomes greater, since the distance between the transitions of bursts 40 and 41 is greater, while the distance between the transitions of bursts 40 and 42 remains unchanged;

In the example of FIG. 2, the magnetic tape 36 is provided with guard bands 48, 49 at the edges of the tape, and four data track regions or locations 50–53 are provided between the defined servo tracks. A plurality of read and write elements 57 are provided at the magnetic tape head 15 for reading and/or writing data on a magnetic tape. When the servo elements 45, 46 are properly positioned at the servo tracks 30–34, the read and write elements 57 are properly positioned to transfer data with respect to the data track locations 50–53 of the magnetic tape 36.

Referring to FIG. 3, the data tracks are becoming increasingly smaller and closer together in order to increase is data capacity by increasing the data track density. The increased data track density is handled by providing laterally indexed defined servo positions which are laterally equidistantly spaced across singly sensible servo tracks. As one example, 6 separate indexed defined servo positions 60–65 are provided for a singly sensible servo track, as illustrated by bursts 40 and 41. Thus, specific ratios of the two servo pattern intervals define each of the index positions.

Figure 4:
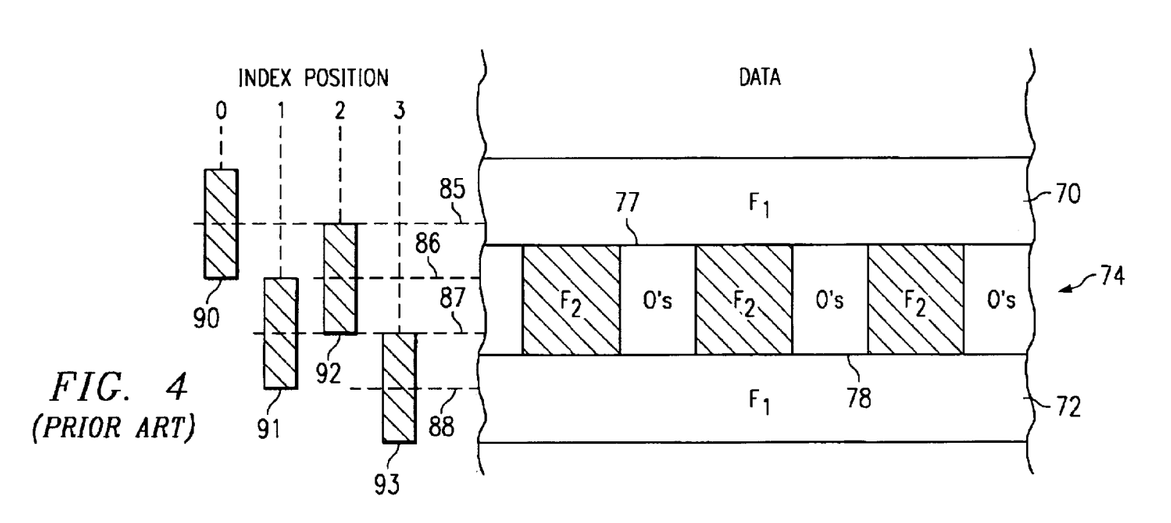
FIG. 4 is a diagrammatic representation of a prior art magnetic tape having an amplitude based servo track for use in the magnetic tape drive of FIG. 1.

FIG. 4 illustrates an amplitude based servo pattern of the type described in:coassigned U.S. patent application Ser. No. 09/365,898, filed Aug. 13, 1999, entitled "Decoding Digitally Sampled Servo Tracks", in which index positions are provided displaced at an offset with respect to each edge, and wherein specific ratios of the two servo pattern frequencies define each of the index positions. The specific ratios are at predetermined offsets from the centered on-edge ratio.

In the specific example of FIG. 4, two outer tracks 70 and 72 have a recording pattern of constant amplitude signal of a single first frequency, on either side of the middle track 74, which alternates between a constant amplitude burst signal of a different frequency and a null signal to provide the edges 77 and 78. The specific ratios of the amplitudes of the two signals are selected to define the desired offset to define index positions 85–88 as identified by the positions 90–93 of the servo read element, e.g., servo read element 45 of FIG. 2.

Those of skill in the art will understand that other systems for indexing from a centered position of a servo track may be envisioned, and that modified versions of the exemplary indexing systems may be employed.

Figure 5:
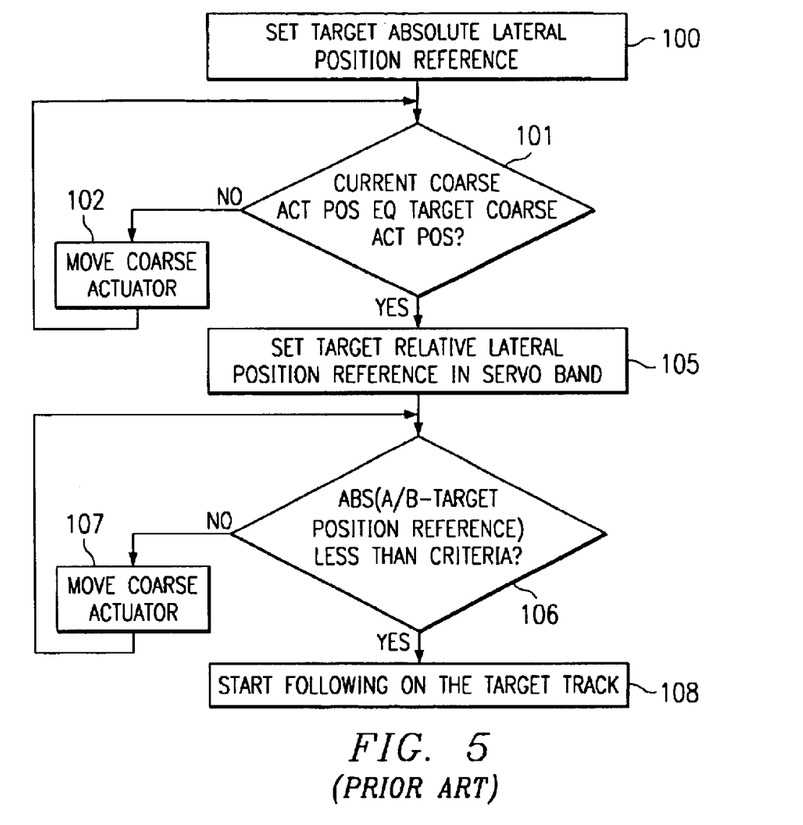
FIG. 5 is a flow chart depicting a prior art method for accessing and following a servo track.

FIG. 5 illustrates a method of the prior art for accessing a desired servo track and the desired indexed position from the servo track, in the typical situation where the coarse actuator portion is moved to the indexed position to maintain the fine actuator portion near its center of motion, and the coarse actuator portion is a stepper motor which is driven forward or backward by step drive pulses. The number of pulses are counted from a reference position, such as at the edge of the tape, and each index position is located at a step count of the stepper motor.

In step 100, the target step count is set to the step count of the desired indexed defined servo position. The target step count of step 100 is compared to the current step count in step 101. If they are not equal, step 102 moves the coarse actuator portion of the compound actuator. The process continues until the coarse actuator reaches the step count of the desired indexed defined servo position. Then., in step 105, the target lateral position ratio is'set to that of the desired indexed defined servo position, and, in steps 106 and 107, the coarse actuator portion is moved only to bring the fine actuator portion within a desired tolerance criteria so that the fine actuator is locked to the, hopefully, desired indexed servo position, and follows the desired indexed defined servo position in step 108.

However, as discussed above, during the track following operation, both the coarse and fine actuator portions are actively controlled to achieve the track following requirements, resulting in a continuously varying lateral position for the coarse actuator portion. Additionally, translating the head between'servo tracks or bands comprises a long distance move, requiring a large number of steps.

Consequently, if steps are missed, for example, due to friction, backlash, non-linearity, or mis-stepping, the position control for the coarse actuator portion accumulates an error between the actual coarse position and the assumed coarse position. The count can therefore easily vary by more than the number of steps between adjacent indexed defined servo positions, with the result that the wrong data tracks are accessed.

Figure 6:
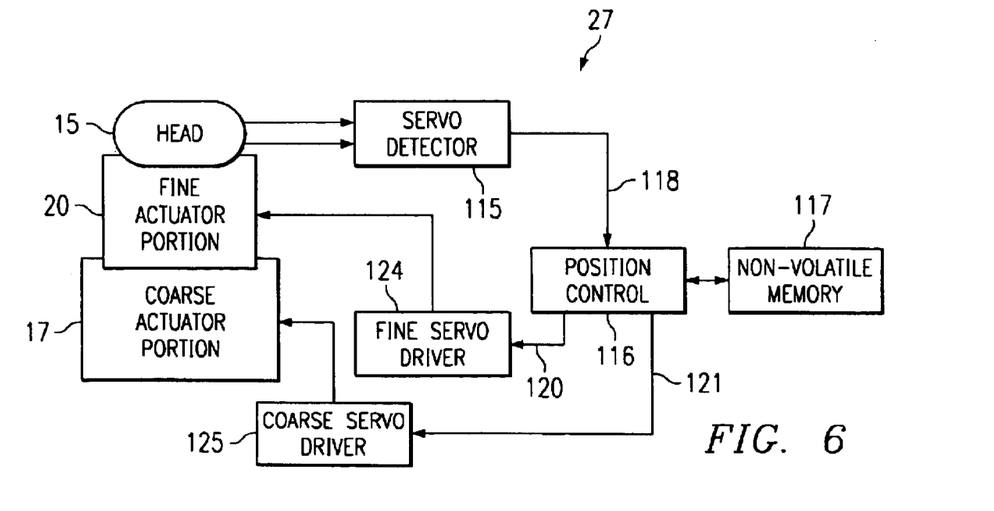
FIG. 6 a block diagram of an embodiment of servo system in accordance with the present invention for operating the compound actuator of FIG. 1.

FIG. 6 illustrates an embodiment of a servo system having a servo controller 27 in accordance with the present invention for operating the compound actuator of FIG. 1. A servo detector 115 is coupled to the servo element or elements 45, 46 of the tape head 15, comprising a servo sensor and detector for sensing the lateral position of the head with respect to the defined servo tracks. The servo detector 115 may comprise an electronic module of servo controller 27.

A position control 116 is provided and may comprise a function within a control unit for both servoing and data handling, and the full control unit may comprise a microprocessor, such as an Intel i930, with an attached non-volatile memory 117 for storing information and programming for the position control. A servo input 118 couples the position control to the servo sensor 115.

The position control 116 provides, for example, digital servo output signals at servo signal outputs 120, 121 for operating the compound actuator to position the actuator portions. Those of skill in the art will understand that various devices are available to provide the needed signals for the servo detector and position control functions. A fine servo driver 124 converts track following servo output signals at output 120 to the appropriate drive signals for operating the fine actuator portion 20, and a coarse servo driver 125 converts the coarse servo output signals at output 121 to, for example, the appropriate step drive signals for operating the stepper motor 17 of the coarse actuator portion 16, 17 of FIG. 1. The position control also tracks the current step count of the coarse actuator portion, which may be initialized at startup by beginning operation at a reference position. However, in accordance with the present invention, the step count is maintained and corrected without reinitializing the compound actuator at the reference position. The position control function 116, memory 117, servo input 118, outputs 120, 121, and drivers 124 and 125 may also comprise electronic modules of servo controller 27.

Figure 7:
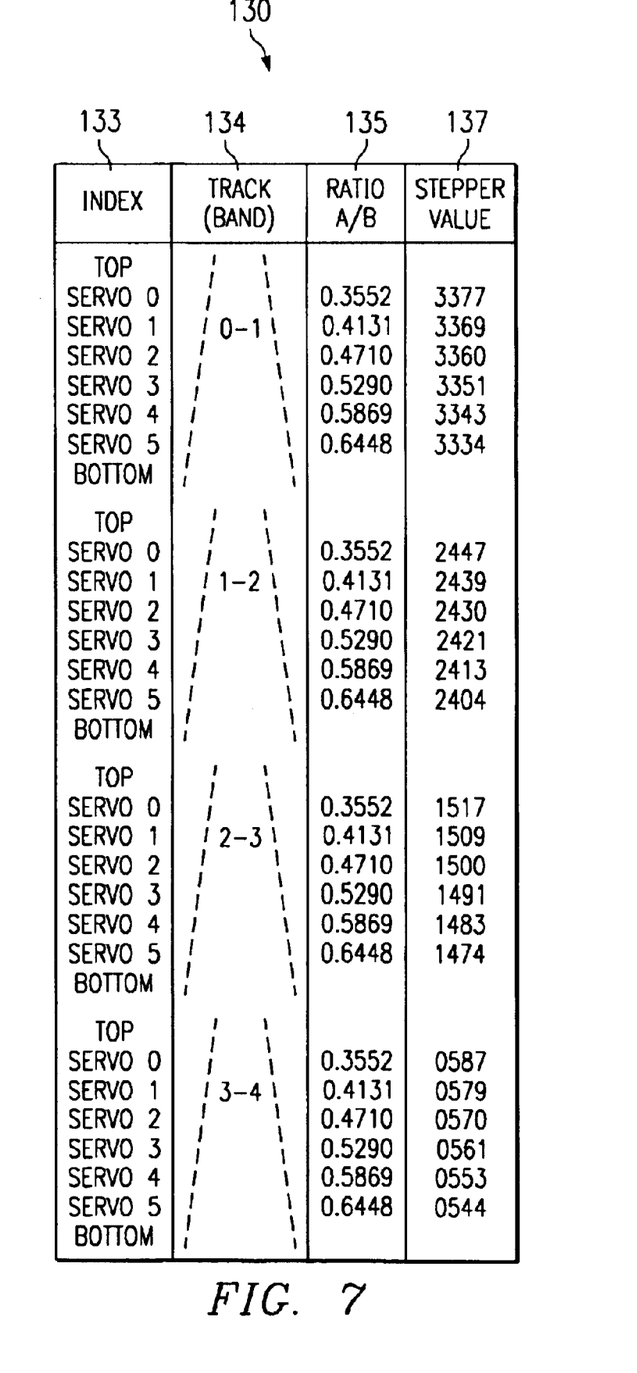
FIG. 7 is a diagrammatic representation of a table of defined servo positions employed by the servo system of FIG. 6.

The present invention employs a table of defined servo positions 130, of the type depicted in FIG. 7. The specific table of FIG. 7 defines the singly sensible servo tracks, and the laterally indexed defined positions within singly sensible servo tracks, for the magnetic tape that is illustrated in FIG. 2. Similar tables may be arranged for the amplitude based singly sensible servo tracks and laterally indexed defined positions of the magnetic tape that is illustrated in FIG. 4. The specific arrangement of FIG. 7 is for servo tracks as sensed by two sensor elements which are averaged by the servo detector and/or position control.

The six indexed defined positions within the five singly sensible servo tracks of FIG. 2, and the five singly sensible servo tracks, are defined in columns 133 and 134, respectively. The diagrams of column 134 are not part of the table, but are provided to indicate the specific position of each indexed defined position within the servo track. In the specific example, the "Top" and"Bottom" positions are at the edges of the servo tracks and are not employed as indexed positions. As is known to those of skill in the art, the specific servo track of column 134 may b e defined by measuring timing or longitudinal position relationships between the tracks, or by a separate sensor which senses the gross position of the compound actuator.

Column 135 indicates the specific ratios of the two servo pattern intervals which define each of the index positions. In an amplitude based; system, column 135 indicates the specific ratios of the two servo pattern amplitudes that define each of the index positions.

Column 137 indicates the predetermined nominal lateral position indication of each defined servo track index position, for example, in terms of the correct step count for each position.

Thus, in accordance with the present invention, and with reference to FIGS. 1–7, the position control 116 positions the coarse actuator portion 16, 17 at an estimated position with respect to the defined servo tracks, and responds to the servo sensor and detector 45, 46, 115 to determine which servo track is closest to the estimated position, for example, by looking up the determined defined servo track from columns 133–135 in the table 130 to determine the coarse actuator portion predetermined nominal lateral position indication in column 137 of the closest defined servo track. The position control sets the coarse actuator portion position indication to the predetermined nominal lateral position indication of the determined defined servo track, for example, in non-volatile memory 117, thereby correcting the indication of the position of the coarse actuator portion. One of skill in the art will recognize that the present invention is equally applicable to servo tracks, for example, of column 134, if no index positions are employed.

Figure 8:
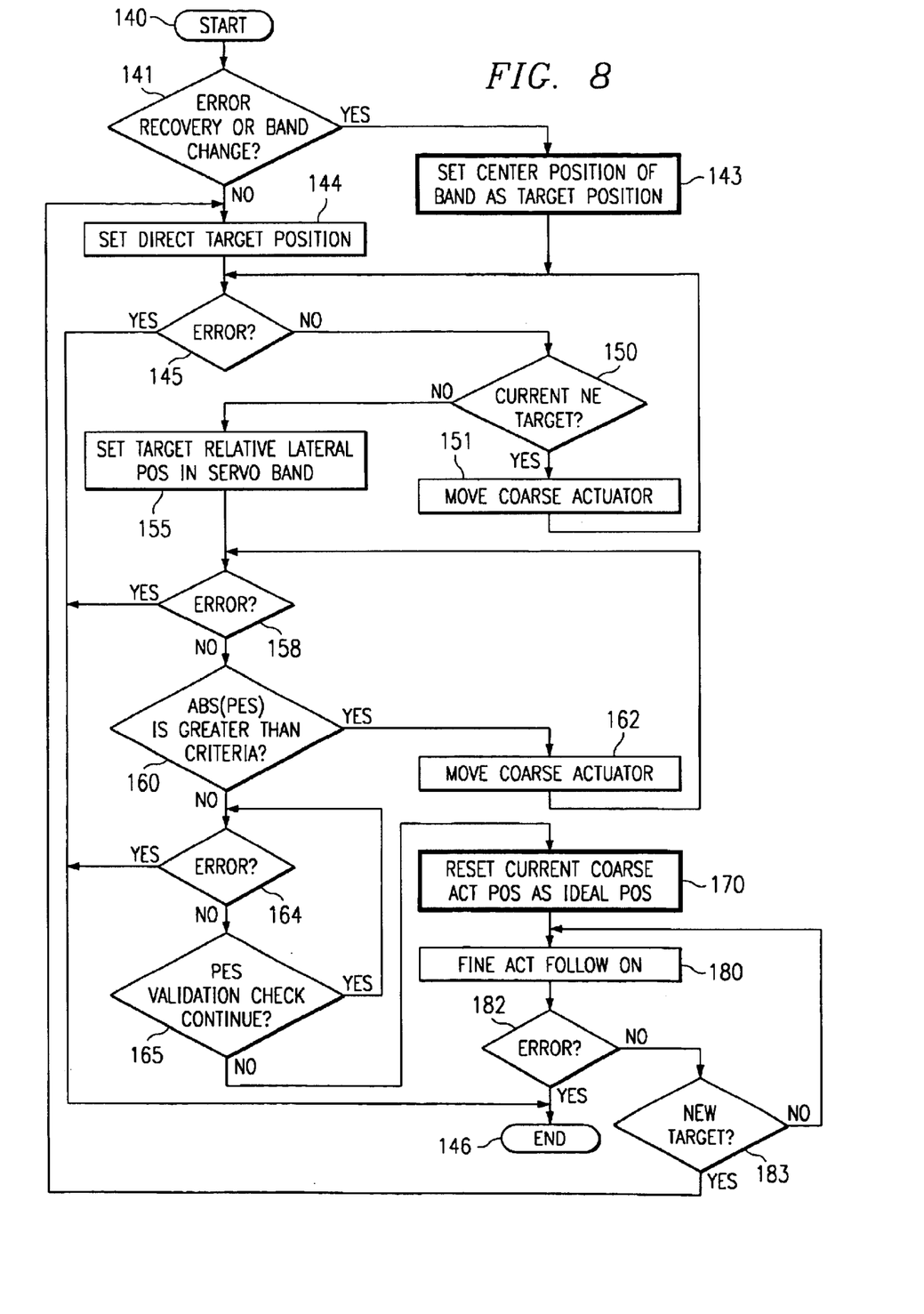
FIG. 8 is a flow chart depicting an embodiment of the method of the present invention as conducted by the servo system of FIG. 6 .

FIG. 8 depicts an embodiment of the method of the present invention as conducted by the servo system of FIG. 6, beginning at step 140. The method both locks to the desired servo track index position and corrects the step count.

Two modes are depicted, a normal mode for maintaining a correct step count, and an acquisition mode which may be required to check the condition of the servo at initialization at the beginning of operation, to lock the target track as the result of error recovery, or when acquiring a target track with a servo track or band change. Step 141 comprises the mode selection. If initialization, error recovery, or a band change is required, "YES", step 143 sets the center of a band, or servo track, as the target position. The step count may be incorrect, thus in accordance with the present invention, a center position is selected to make it less likely that the servo track, e.g., tracks 31–33 in FIG. 2, will be missed. Also, the edges of the servo tracks may have variations that make the detection less accurate. In the example of FIG. 3, the center position may comprise index position 62 or index position 63, or in the example of FIG. 4, the center position may comprise index position 86 or index position 87, all of which are equally distant from the center.

If, instead, the mode is normal, "NO" in step 141, the desired servo track index position is directly set in step 144. Step 145 represents a major error situation, for example, if the servo sensor 45, 46, 115 is unavailable, and will end the current process at step 146, leading to an error recovery process.

In step 150, the target step count is compared to the current step count to determine whether the counts are not equal, or "NE". If the counts are not equal, "YES", the coarse actuator portion is moved in step 151. The process is repeated until the coarse actuator portion has moved to the target step count, "NO" in step 150.

Upon reaching the target step count, in step 155, the target lateral position ratio, for example, of column 135 of the table 130 of FIG. 7, is set to that of the estimated indexed defined servo position, and, after error step 158, in steps 160 and 162, the coarse actuator portion is moved to bring the "A"/"B" ratio within a desired tolerance criteria of position error (PES), such as within 5%, so that the fine actuator is within range of the closest indexed servo position. At this point, there will have been an accumulation or build up of missed steps, but the estimated servo index position will be reached by steps 160 and 162, employing the "A"/"B" ratio.

After error step 164, the PES validation continues, the servo positioner locking the fine actuator portion to the target defined servo track index position and moving the coarse actuator portion as needed to center the fine actuator portion. At this point, the position control has positioned the coarse actuator portion at the estimated position with respect to the defined servo tracks, and determined which defined servo track index position is closest to the estimated position, e.g., based on the "A"/"B" ratio.

Thus, in step: 170, the position control sets or resets the coarse actuator portion position indication to the predetermined nominal lateral position indication of that defined servo track, for example, as determined from column 137 of table 130 in FIG. 7. As the result, any misstep or error of the indication of the position of the coarse actuator portion is corrected.

The normal track following by the compound actuator is then conducted in step 180. After error step 182, step 183 comprises a routine to determine whether a new target has been requested, and, if not, the track following continues. If a new target has been requested, the process cycles back to step 144 to again set the desired servo track index position.

Thus, the present invention comprises a lateral position recovery system, updating the current coarse actuator position indication to the nominal position indication already calculated and prepared, for example, in the reference table of FIG. 7, after the lateral position is identified as valid. This system cancels the (accumulated) lateral position offset after the coarse actuator moves. Further, the lateral position recovery system, which selects the coarse actuator target position as the center position of the target servo band, instead of the target position directly, at initialization, or error recovery, or when the lateral position changes with a servo band change, provides a reliable basis for the identification of the correct lateral position. Additionally, the direct selection of the target track if there is no servo band change allows a high performance switch between data tracks.

Those of skill in the art will understand that the steps of FIG. 8 may be arranged differently, and that the functions of the elements of FIG. 6 may be rearranged or modified without departing from the present invention. The method may, for example, implemented in microcode and stored in non-volatile memory 117 of FIG. 6, or distributed to the modules, for operating the servo system.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a servo system for positioning a head laterally with respect to defined servo tracks, said servo system comprising a servo sensor and detector for sensing lateral position of said head with respect to said defined servo tracks, a compound actuator having a fine actuator portion for translating said head laterally with respect to said defined servo tracks and a coarse actuator portion for translating said fine actuator portion laterally with respect to said defined servo tracks, said coarse actuator portion having position indications comprising predetermined nominal lateral position indications with respect to said defined servo tracks, and a position control coupled to said servo sensor and detector for operating said compound actuator to position said actuator portions at one of said defined servo tracks, and to track follow said one defined servo track, a method comprising:

operating said position control to position said coarse actuator portion at an estimated position with respect to said defined servo tracks;

determining which said defined servo track is closest to said estimated position of said operating step; and setting said coarse actuator portion position indication to said predetermined nominal lateral position indication of said defined servo track determined in said determining step.

2. The method of claim 1, wherein said servo system coarse actuator portion comprises a stepper motor, and wherein said position indications comprise step counts for said stepper motor, and wherein said setting step comprises setting said coarse actuator portion position indication to said step count of said predetermined nominal lateral position of said defined servo track determined in said determining step.

3. The method of claim 1, wherein said coarse actuator portion predetermined nominal lateral position indications with respect to said defined servo tracks comprises a table relating said predetermined nominal lateral position indications to said defined servo tracks, and wherein said setting step comprises looking up said determined defined servo track in said table to determine said coarse actuator portion predetermined nominal lateral position indication of said defined servo track.

4. The method of claim 1, wherein said defined servo tracks comprise laterally indexed defined positions within singly sensible servo tracks, at least one of said indexed defined servo positions centrally located with respect each said singly sensible servo track, and wherein said method additionally comprises the step of initially conducting said operating step to position said coarse actuator portion at an estimated position of said centrally located indexed defined servo positions, and said determining step said closest defined servo track comprises one of said indexed defined servo positions.

5. The method of claim 4, wherein said singly sensible servo tracks comprise timing based servo tracks and wherein said indexed defined servo positions comprise positions laterally equidistantly spaced across said singly sensible servo tracks, and wherein said centrally located indexed defined servo positions are located so as to have a substantially equal number of said indexed defined servo positions on either side thereof.

6. The method of claim 4, wherein said singly sensible servo tracks comprise amplitude based servo tracks having a central edge between two frequency signals and wherein said indexed defined servo positions comprise positions laterally equidistantly spaced across said singly sensible servo tracks, and wherein said centrally located indexed defined servo positions are located substantially at said central edge.

7. The method of claim 1, wherein said operating step comprises operating said position control to position said coarse actuator portion within a predetermined lateral distance of said closest said defined servo track.

8. A servo system for positioning a head laterally with respect defined servo tracks, comprising:
 a servo sensor and detector for sensing lateral position of said head with respect to said defined servo tracks;
 a compound actuator having a fine actuator portion for translating said head laterally with respect to said defined servo tracks, and a coarse actuator portion for translating said fine actuator portion laterally with respect to said defined servo tracks; and
 a position control coupled to said servo sensor and detector and coupled to said compound actuator for operating said compound actuator to position said actuator portions, said position control:
  providing position indications for said coarse actuator portion comprising predetermined nominal lateral position indications with respect to said defined servo tracks;
  positioning said coarse actuator portion at an estimated position with respect to said defined servo tracks;
  upon said positioning, responding to said servo sensor to determine which said servo track is closest to said estimated position; and
  setting said coarse actuator portion position indication to said predetermined nominal lateral position indication of said determined defined servo track.

9. The servo system of claim 8, wherein said coarse actuator portion comprises a stepper motor, wherein said position controller provided position indications comprise step counts for said stepper motor, and wherein said position control sets said coarse actuator portion position indication to said step count of said predetermined nominal lateral position of said determined defined servo track.

10. The servo system of claim 8, wherein said position control coarse actuator portion predetermined nominal lateral position indications with respect to said defined servo tracks comprises a table relating said predetermined nominal lateral position indications to said defined servo tracks, and wherein said position control looks up said determined defined servo track in said table to determine said coarse actuator portion predetermined nominal lateral position indication of said defined servo track to set said coarse actuator portion position indication.

11. The servo system of claim 8, wherein said defined servo tracks comprise laterally indexed defined servo positions within singly sensible servo tracks recorded on magnetic tape, at least one of said indexed defined servo positions centrally located with respect each said singly sensible servo track, wherein said servo sensor and detector comprises a magnetic servo read head, and wherein said position control estimated position comprises one of said centrally located indexed defined servo positions, and said closest defined servo track comprises one of said indexed defined servo positions.

12. The servo system of claim 11, wherein said singly sensible servo tracks comprise timing based servo tracks and wherein said indexed defined servo positions comprise positions laterally equidistantly spaced across said singly sensible servo tracks, and wherein said centrally located indexed defined servo positions are located so as to have a substantially equal number of said indexed defined servo positions on either side thereof.

13. The servo system of claim 11, wherein said singly sensible servo tracks comprise amplitude based servo tracks having a central edge between two frequency signals and wherein said indexed defined servo positions comprise positions laterally equidistantly spaced across said singly sensible servo tracks, and wherein said centrally located indexed defined servo positions are located substantially at said central edge.

14. The servo system of claim 8, wherein said position control positions said coarse actuator portion within a predetermined lateral distance of said closest defined servo tracks.

15. In a servo system for positioning a head laterally with respect to defined servo tracks, said servo system comprising a servo sensor and detector for sensing lateral position of said head with respect to said defined servo tracks, a compound actuator having a fine actuator portion for translating said head laterally with respect to said defined servo tracks and a coarse actuator portion for translating said fine actuator portion laterally with respect to said defined servo tracks, a servo controller comprising:
 a servo input coupled to said servo sensor and detector;
 a servo signal output for operating said compound actuator to position said actuator portions; and
 a position control coupled to said servo input and to said servo signal output, said position control:

providing position indications for said coarse actuator portion comprising predetermined nominal lateral position indications with respect to said defined servo tracks;

providing servo signals at said servo signal output to position said coarse actuator portion at an estimated position with respect to said defined servo tracks;

upon said positioning, responding to said servo sensor and detector at said servo input to determine which said servo track is closest to said estimated position; and setting said coarse actuator portion position indication to said predetermined nominal lateral position indication of said determined defined servo track.

16. The servo controller of claim 15, wherein said coarse actuator portion comprises a stepper motor, wherein said position control provided position indications comprise step counts for said stepper motor, and wherein said position control sets said coarse actuator portion position indication to said step count of said predetermined nominal lateral position of said determined defined servo track.

17. The servo controller of claim 15, wherein said position control coarse actuator portion predetermined nominal lateral position indications with respect to said defined servo tracks comprises a table relating said predetermined nominal lateral position indications to said defined servo tracks, and wherein said position control looks up said determined defined servo track in said table to determine said coarse actuator portion predetermined nominal lateral position indication of said defined servo track to set said coarse actuator portion position indication.

18. The servo controller of claim 15, wherein said defined servo tracks comprise laterally indexed defined servo positions within singly sensible servo tracks recorded on magnetic tape, at least one of said indexed defined servo positions centrally located with respect each said singly sensible servo track, wherein said servo sensor and detector comprises a magnetic servo read head, and wherein said position control estimated position comprises one of said centrally located indexed defined servo positions, and said closest defined servo track comprises one of said indexed defined servo positions.

19. The servo controller of claim 18, wherein said singly sensible servo tracks comprise timing based servo tracks and wherein said indexed defined servo positions comprise positions laterally equidistantly spaced across said singly sensible servo tracks, and wherein said centrally located indexed defined servo positions are located so as to have a substantially equal number of said indexed defined servo positions on either side thereof.

20. The servo controller of claim 18, wherein said singly sensible servo tracks comprise amplitude based servo tracks having a central edge between two frequency signals and wherein said indexed defined servo positions comprise positions laterally equidistantly spaced across said singly sensible servo tracks, and wherein said centrally located indexed defined servo positions are located substantially at said central edge.

21. The servo controller of claim 15, wherein said position control positions said coarse actuator portion within a predetermined lateral distance of said closest defined servo tracks.

22. A magnetic tape data storage drive for transferring data with respect to a magnetic tape, said magnetic tape having a plurality of parallel defined servo tracks extending in the longitudinal direction of said magnetic tape, comprising:

a magnetic tape head for transferring data with respect to said magnetic tape;

a tape drive system for moving a magnetic tape in said longitudinal direction past said magnetic tape head;

a servo sensor and detector for sensing lateral position of said magnetic tape head with respect to said defined servo tracks;

a compound actuator having a fine actuator portion for translating said magnetic tape head laterally with respect to said defined servo tracks, and a coarse actuator portion for translating said fine actuator portion laterally with respect to said defined servo tracks; and a position control coupled to said servo sensor and detector for operating said compound actuator to position said actuator portions, said position control:

providing position indications for said coarse actuator portion comprising predetermined nominal lateral position indications with respect to said defined servo tracks;

positioning said coarse actuator portion at an estimated position with respect to said defined servo tracks;

upon said positioning, responding to said servo sensor and detector to determine which said defined servo track is closest to said estimated position; and setting said coarse actuator portion position indication to said predetermined nominal lateral position indication of said determined defined servo track.

23. The magnetic tape data storage drive of claim 22, wherein said coarse actuator portion comprises a stepper motor, wherein said position controller provided position indications comprise step counts for said stepper motor, and wherein said position control sets said;coarse actuator portion position indication to said step count of said predetermined nominal lateral position of said determined defined servo track.

24. The magnetic tape data storage drive of claim 22, wherein said position control coarse actuator portion predetermined nominal lateral position indications with respect to said defined servo tracks comprises a table relating said predetermined nominal lateral position indications to said defined servo tracks, and wherein said position control looks up said determined defined servo track in said table to determine said coarse actuator portion predetermined nominal lateral position indication of said defined servo track to set said coarse actuator portion position indication.

25. The magnetic tape data storage drive of claim 22, wherein said defined servo tracks comprise laterally indexed defined servo positions within singly sensible servo tracks recorded on said magnetic tape, at least one of said indexed defined positions centrally located with respect each said singly sensible servo tracks, wherein said servo sensor and detector comprises a magnetic servo read head, and wherein said position control estimated position comprises one of said centrally located indexed defined servo positions, and said closest defined servo track comprises one of said indexed defined servo positions.

26. The magnetic tape data storage drive of claim 25, wherein said singly sensible servo tracks comprise timing based servo tracks and wherein said indexed defined servo positions comprise positions laterally equidistantly spaced across said singly sensible servo tracks, and wherein said centrally located indexed defined servo positions are located so as to have a substantially equal number of said indexed defined servo positions on either side thereof.

27. The servo system of claim 25, wherein said singly sensible servo tracks comprise amplitude based servo tracks having a central edge between two frequency signals and wherein said indexed defined servo tracks comprise positions laterally equidistantly spaced across said singly sensible servo tracks, and wherein said centrally located indexed defined servo tracks are located substantially at said central edge.

28. The servo system of claim 22, wherein said position control positions said coarse actuator portion within a predetermined lateral distance of said closest defined servo tracks.

* * * * *

UNITED STATES PATENT AND TRADEMARK OFFICE
CERTIFICATE OF CORRECTION

PATENT NO. : 6,721,126 B1
DATED : April 13, 2004
INVENTOR(S) : Bui et al.

It is certified that error appears in the above-identified patent and that said Letters Patent is hereby corrected as shown below:

Column 12,
Line 33, change "said;coarse" to -- said coarse --

Signed and Sealed this

Sixth Day of July, 2004

JON W. DUDAS
*Acting Director of the United States Patent and Trademark Office*